US006392727B1

(12) United States Patent
Larson et al.

(10) Patent No.: US 6,392,727 B1
(45) Date of Patent: May 21, 2002

(54) REDUCED REFLECTANCE POLARIZED DISPLAY

(75) Inventors: Brent D. Larson, Cave Creek; Elias S. Haim, Glendale, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/224,591

(22) Filed: Dec. 31, 1998

(51) Int. Cl.[7] .................. G02F 1/1333; G02F 1/1335
(52) U.S. Cl. ................. 349/96; 349/117; 349/137; 349/122
(58) Field of Search .................. 349/96, 122, 158, 349/117; 399/137

(56) References Cited

U.S. PATENT DOCUMENTS

| 5,486,840 | A | | 1/1996 | Borrego et al. |
| 5,701,165 | A | | 12/1997 | Kubo et al. |
| 6,108,059 | A | * | 8/2000 | Yang ............................. 349/96 |
| 6,124,907 | A | * | 9/2000 | Jones et al. .................... 349/96 |
| 6,147,738 | A | * | 11/2000 | Okamoto ...................... 349/96 |

FOREIGN PATENT DOCUMENTS

JP  7301795 A  11/1995

OTHER PUBLICATIONS

PCT "Notification of Transmittal of the International Preliminary Examination Report, and International Preliminary Examination Report", Feb. 22, 2001, PCT/US99/27720, 8 pgs.

* cited by examiner

Primary Examiner—Toan Ton

(57) ABSTRACT

A method and apparatus according to various aspects of the present invention provides a polarized display exhibiting reduced reflectances. A polarizer is disposed adjacent to a cover glass in front of the display. Light intended to be transmitted by the display is transmitted by the polarizer. Light reflected after passing through the polarizer reverses polarization, and is absorbed as it intercepts the polarizer following reflection.

16 Claims, 3 Drawing Sheets

REDUCED REFLECTANCE POLARIZED DISPLAY

BACKGROUND OF THE INVENTION

1. Field of the Invention

The invention relates to displays, and more particularly, to methods and apparatus for reducing unwanted reflections in displays.

2. Description of the Related Art

In display applications, it is difficult to maintain high contrast output at high ambient illumination levels. However, polarized light displays and active matrix liquid crystal display (AMLCD) flat panels work well in maintaining the contrast in their displays because light passes through several absorbing layers before reflecting or scattering back out from the light producing mechanism. The multiple layers, however, adversely affect the total reflectance of the display. Even though the reflectance at layer boundary in itself may be quite small, the sum of the reflections may be significant.

Referring to FIG. 1, a conventional polarized display 2, such as a liquid crystal display (LCD), includes a cover glass 4 having an antireflective coating 6. A front polarizer 8, a first substrate 10, a liquid crystal layer 12, a second substrate 14, and a rear polarizer 16 are sandwiched between the cover glass 4 and a backlight 18. The cover glass 4 is separated from the front polarizer 8 by a gap 9, typically filled with air. The reflectance at each boundary between the layers adds to the overall reflectance of the display. Reflectances associated with the boundaries between the cover glass 4, the gap 9, and the front polarizer 8 are especially pronounced.

Several methods have been developed to reduce reflectances. For example, antireflection coatings 6 may be added to one or both sides of the cover glass 4, which tends to reduce the reflection from the front of the cover glass 4. Additionally, an antireflection coating may be added to the surface of the front polarizer 8. However, the suppression of the residual reflection still remains a problem. Another method involves applying adhesives between the cover glass 4 and the front polarizer 8 to bond the glass to the polarizer and achieve some level of index matching, which tends to reduce the reflectances from the boundary between the cover glass 4 and the air gap 9 or the front polarizer 8. While bonding the cover glass 4 to the display is somewhat successful in reducing reflectances, it tends to affect the uniformity of the liquid crystal cell gap, induces difficulty in repairs, and is associated with other problems due to aging effects and shrinkage of the adhesive.

Another alternative is to add attenuating contrast enhancement filters to the display to filter out the reflectances. For example, a filter may be added between the cover glass 4 and the gap 9 or the front polarizer 8, or alternatively a specialized tinted glass may be used for the cover glass 4. Addition of the filter reduces reflection, but also attenuates the display output. Further, addition of the filter tends to promote other issues, such as cost, color shifts, and environmental concerns.

SUMMARY OF THE INVENTION

A display according to various aspects of the present invention comprises a polarized display that has reduced reflectances in the output of the display to maintain high contrast output, high illumination levels, and less expensive production. A polarizer is disposed adjacent to a cover glass in front of the display. Light intended to be transmitted through the display is transmitted by the polarizer. Light reflected after passing through the polarizer is further attenuated as it intercepts the polarizer following reflection.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which like parts may be referred to by like numerals:

DETAILED DESCRIPTION OF PREFERRED EXEMPLARY EMBODIMENTS

The subject matter of the present invention is particularly suited for use in connection with displays, such as LCDs. As a result, the preferred exemplary embodiment of the present invention is described in that context. It should be recognized, however, that such description is not intended as a limitation on the use or applicability of the present invention, but is instead provided merely to enable a full and complete description of a preferred embodiment.

Figure 1:
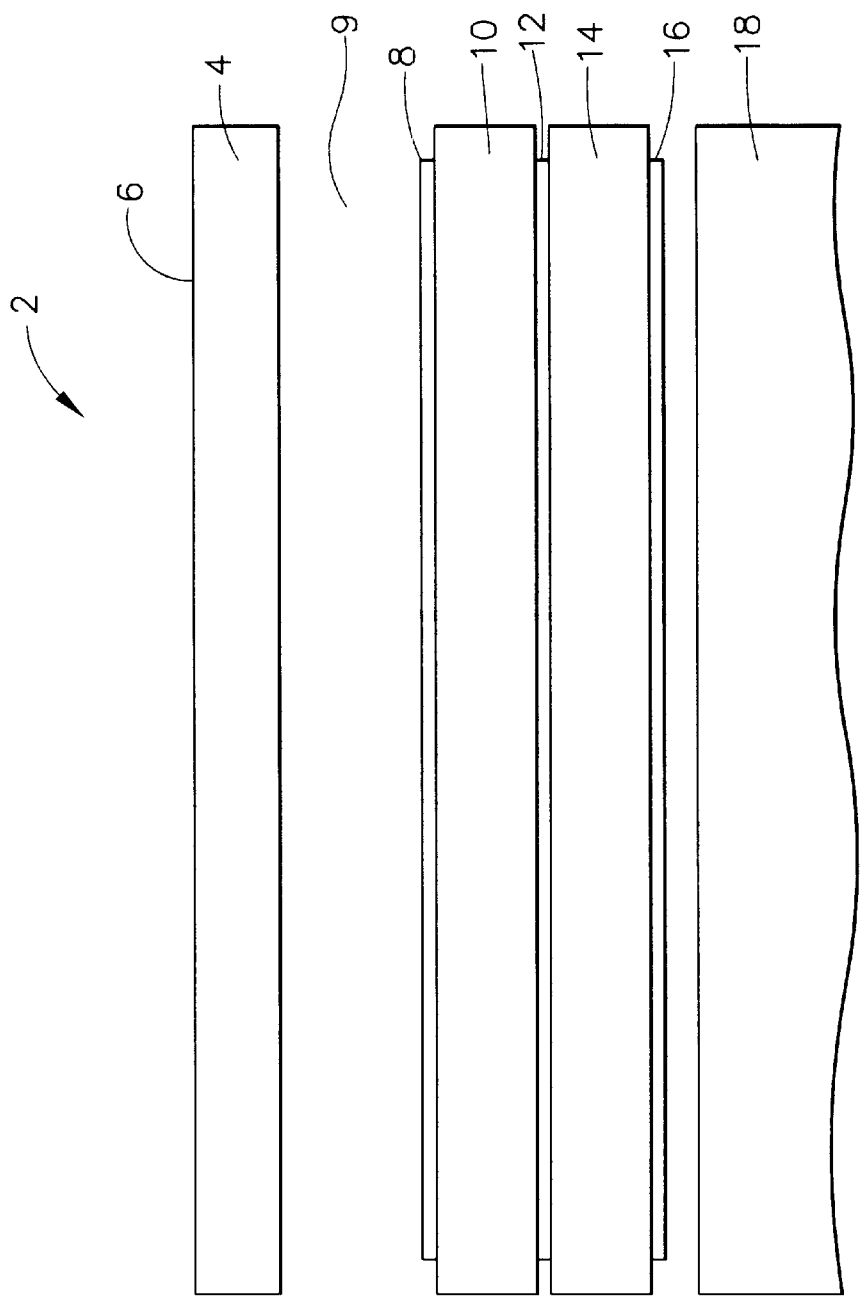
FIG. 1 shows a conventional polarized display.
Figure 2:
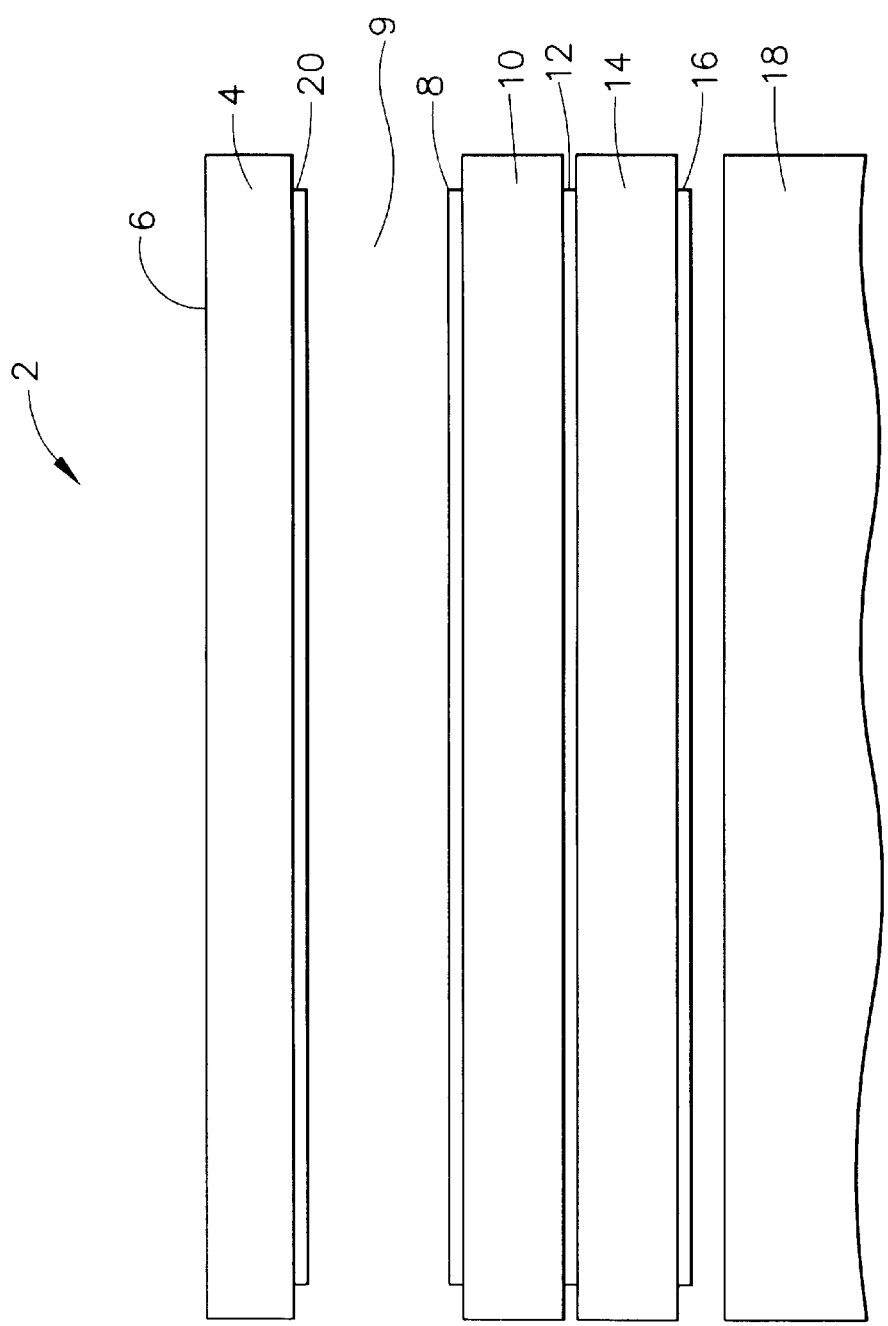
FIG. 2 shows a polarized display according to various aspects of the present invention.

Referring now to FIG. 2, a display 2 according to various aspects of the present invention comprises: a cover glass 4; a front gap 9; a front polarizer 8; a first substrate 10; a liquid crystal layer 12; a second substrate 14; a rear polarizer 16; an auxiliary polarizer 20; and a backlight 18. Each of the components of the display 2 is suitably a conventional LCD component. In particular, the cover glass 4 suitably comprises a conventional cover glass for use in conjunction with LCDs, especially high contrast LCDs, to protect the underlying components and transmit light from the backlight passing through the other components. While referred to as a cover glass, the cover glass 4 can be made from glass, plastic or any other fully or partially transparent material with suitable physical properties. To reduce reflections at the boundary between the cover glass 4 and the front gap 9, the rear surface of cover glass 4 adjacent the front gap boundary 9 or auxiliary polarizer 20 may include a suitable antireflection material. For example, the rear surface of the cover glass 4 may include an antireflection coating, film, sheet, or any other form of antireflection material. The addition of the antireflection coating to the rear of the cover glass 4 tends to reduce reflections at the boundary between the cover glass 4 and the auxiliary polarizer 20 or, if the auxiliary polarizer is omitted, the front gap 9.

The front and rear polarizers 8, 16 suitably comprise conventional polarizers for use in conjunction with LCDs. The front and rear polarizers 8, 16 may be oriented in any suitable manner to selectively transmit light from the backlight 18 to the viewer through the front and rear polarizers 8, 16 and the liquid crystal layer 12.

Similarly, the first and second substrates 10, 14 suitably comprise conventional LCD transparent substrates. The substrates 10, 14 suitably comprise sheets of transparent material, such as glass coated with indium tin oxide or otherwise suitably coated glass or transparent polymer.

A space is formed between the substrates 10, 14 and filled with the liquid crystal layer 12. The liquid crystal layer 12 may comprise any suitable liquid crystal material, such as a twisted nematic or supertwisted nematic material. A seal formed around the edges of the substrates 10, 14 inhibits leakage of the liquid crystal material 12 from between the substrates 10, 14. The display may comprise a monochrome gray-scale display, a binary display, a color display, or any other type of display. Similarly, the backlight 18 comprises any appropriate light source for illuminating display 2. In some embodiments, the backlight 18 may be omitted and the display 2 reconfigured as a reflective display.

In the present embodiment, the display includes the auxiliary polarizer 20 between the front gap 9 and the cover glass 4. The front gap 9 separates the auxiliary polarizer 20 from the front polarizer 8. The auxiliary polarizer 20 may be bonded to the cover glass 4 or otherwise retained in display 2, and may be coated with an antireflective coating on one or both surfaces. The auxiliary polarizer 20 is an absorbing polarizer, preferably of a similar type as the front polarizer, and is preferably aligned in the same direction as the front polarizer 8. Alignment of the polarizers 8, 20 in the same direction minimizes the attenuation of light coming from the backlight 18. This allows maximum transmission of the light with little to no attenuation of the light. Reflected light, however, initially passes through the cover glass and is polarized by the auxiliary polarizer 20. By removing one of the polarizations before it reaches the gap 9, the reflections from each of the interfaces between the auxiliary polarizer 20 and front polarizer 8 are reduced by around 50%. This allows for reduced overall reflections, or can be used to reduce the reflectance requirements for any antireflection coatings which may be applied to the front and auxiliary polarizers 8, 20.

Whereas the incorporation of auxiliary polarizer 20 affects the reflectances in the vicinity of the gap 9 most directly, the configuration can also be adjusted in a manner which provides very convenient and beneficial introduction of attenuation for other reflectances. By selecting an auxiliary polarizer 20 with somewhat lower transmittance, the functionality of a conventional attenuating contrast enhancement filter can be achieved without additional elements or cost. Alternately, similar attenuation can be achieved by rotating the polarizing axis of auxiliary polarizer 20 relative to the polarizing axis of front polarizer 8. In both cases, a significant degree of contrast enhancement can be achieved with a minimum of additional cost, complexity or risk of chromatic variation in the display output.

In an alternative embodiment, the auxiliary polarizer 20 is included in the display 2, and the front polarizer 8 is omitted. Operationally, the display 2 functions identically; light transmitted through the liquid crystal layer 12 is either polarized in the direction of the rear polarizer 16 (i.e., substantially unaffected by the liquid crystal layer 12), or is polarized in another direction by the liquid crystal layer 12. Whether the light is transmitted to the viewer depends on the orientation of the front polarizer 8 or, in the present embodiment, the auxiliary polarizer 20. In the absence of the front polarizer 8, light which is not polarized in alignment with the auxiliary polarizer 20 is absorbed and not transmitted to the user.

Another embodiment of the present invention includes an index matching material disposed in the front gap 9. The index matching material may comprise any suitable material for more closely matching the refractive index of the materials adjacent the front gap 9, such as the cover glass 4, auxiliary polarizer 20, or the antireflection material on the rear of cover glass 4, and the front polarizer 8 or the antireflection material on the front surface of the front polarizer 8. The index matching material may comprise any material having an appropriate refractive index, may be in any suitable form, such as gel, epoxy, oil, liquid, plastic, gas, or the like. In addition, the index matching material may also have an appropriate antireflective material, such as a coating, plating, or film, to further reduce reflections.

The front polarizer 8, the rear polarizer 16, and/or the auxiliary polarizer 20 may also include antireflection material to reduce reflectance. For example, any or all of the polarizers may be coated, plated, or otherwise integrated with or adjacent to an antireflection material. In one embodiment, the antireflection material is integrated into the polarizer, such as with commercially available antireflection-coated polarizers available from Nitto or other polarizer suppliers. In addition, any or all of the polarizers 8, 16, 20, particularly auxiliary polarizer 20, may be lower efficiency polarizers which transmit only a fraction of the light polarized in the direction of polarization. For example, a polarizer which transmits 85% of the light polarized in the direction of polarization transmits 85% of the light from the backlight to be transmitted. The polarized portion of the light reflected through the cover glass 4, however, is attenuated as it passes through the polarizer both ways. Therefore, the overall reflectance of the polarized portion is reduced by 27.75%. This configuration may be appropriate for various applications requiring low reflectance and adaptable to less than optimal overall brightness.

Figure 3:
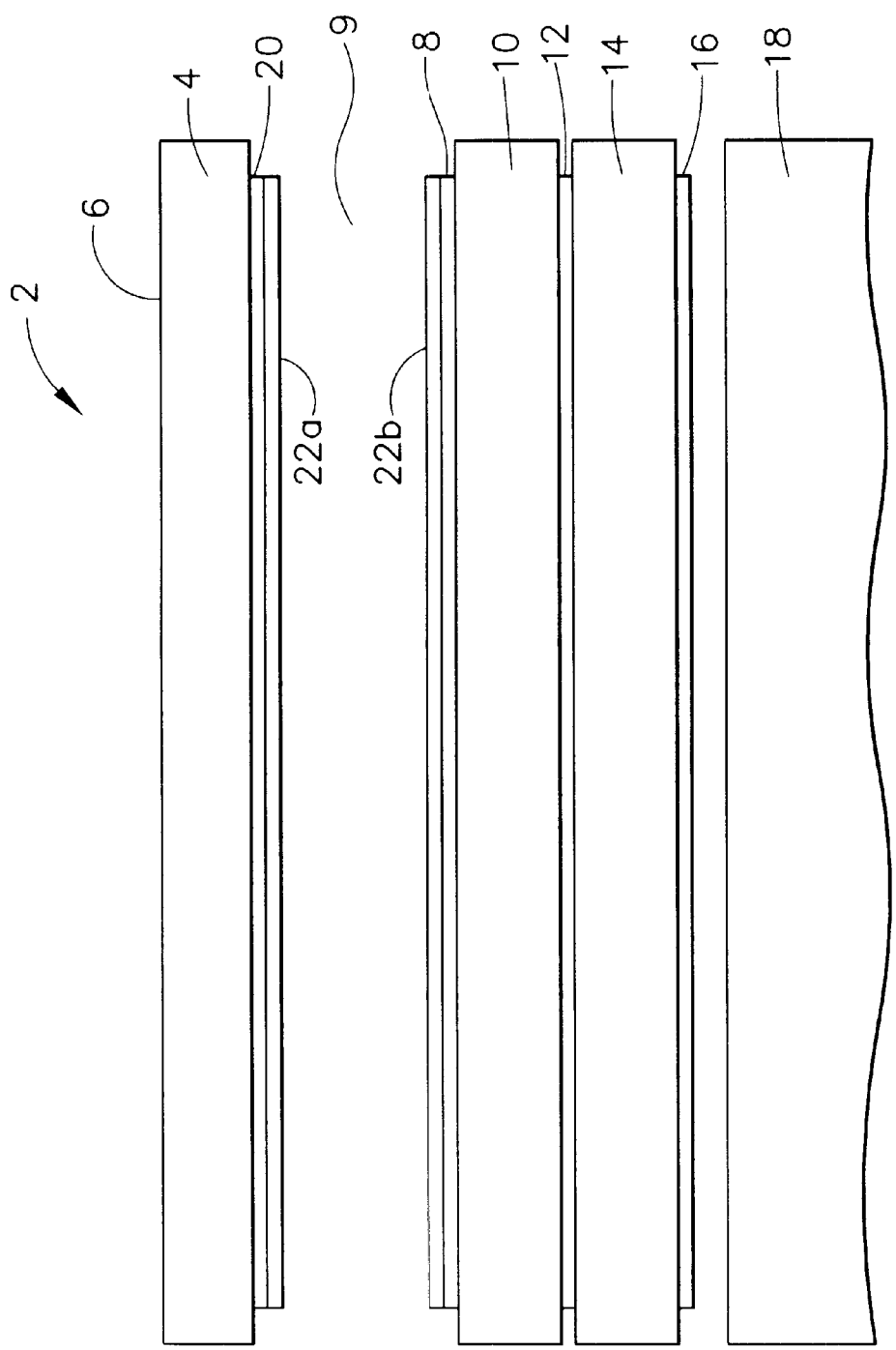
FIG. 3 shows an alternate embodiment of a polarized display according to various aspects of the present invention.

Referring to FIG. 3, another display according to various aspects of the present invention employs circular polarization to reduce reflectances in the vicinity of the gap 9. A linear auxiliary polarizer 20 is disposed adjacent to the cover glass 4. A retarder, such as a quarter wave retarder 22a, is disposed adjacent to the linear auxiliary polarizer 20, such that light passing through the auxiliary polarizer 20 and the wave retarder 22a is substantially circularly polarized. Similarly, a second quarter wave retarder 22b is disposed adjacent to the front polarizer 8 to achieve substantially circular polarization for light which passes through the display from the other side. The retarder axes are arranged at a suitable angle from the polarizer axes, such as 45 degrees, to achieve substantially circular polarization in the gap 9 for light incident from either the front or back of the display. The auxiliary polarizer 20 and the retarders 22a–b are oriented to achieve the same substantially circular orientation, or "handedness" (i.e., left-handed or right-handed), so that light transmission from the backlight 18 is not affected. For example, light passing through the front polarizer 8 and the first wave retarder 22a is circularly polarized in a first direction. Because the auxiliary polarizer 20 and the second wave retarder 22b transmit light having the same circular polarization as the front polarizer 8 and the first wave retarder 22a, light from the backlight 18 tends to be transmitted.

Reflected light, however, is absorbed by the polarizers. Light initially transmitted through the auxiliary polarizer 20 and the first retarder 22a is circularly polarized in a first direction. Light reflected from a boundary, however, reverses the direction of its circular polarization. Thus, as the reflected light from the interface between the gap 9 and the retarder 22a, or the gap 9 and the retarder 22b, intercepts the auxiliary polarizer 20 and the retarder 22a, the light is absorbed.

While the present circular polarization method is effective at eliminating the reflectance associated with the gap 9 and its surrounding layers, even further reduction is possible by suitably associating each of the retarders 22a–b with at least one antireflection layer, for example between the retarders 22a–b and their respective polarizers 8, 20 or the gap 9 to reduce reflections at the corresponding boundary.

In one embodiment of the present display, the quarter wave retarders 22a and 22b are identical but are oriented with their respective optical axes offset by 90 degrees from each other. In this case, the front polarizer 8 and the auxiliary polarizer 20 are preferably oriented with parallel polarization axes. This configuration uses common components and tends to provide both minimum reflection and maximum transmission for light which is distributed over a moderate range of angles relative to the display normal. At very steep, or wide angles, performance can be degraded slightly, however, both in terms of reflection or especially transmission. Alternative configurations may provide optimization for displays requiring wide angle performance.

In an alternative embodiment of the present display configured for wide angle operation, the quarter wave retarders 22a, 22b have opposing birefringence to improve the transmissibility of the display at large viewing angles. One quarter wave retarder has positive birefringence ($n_e > n_o$) and the other quarter wave retarder has negative birefringence ($n_e < n_o$). The optical axes of the quarter wave retarders are aligned parallel to one another and 45 degrees from the polarization axis. In this configuration, the phase shifts through the retarders 22a and 22b cancel each other out over a wide angular range.

Additional circular polarizer configurations can be designed which incorporate multiple layer retarders and irregular materials or angles. These might be used, for example, to implement wide-band quarter wave retarders, to achieve achromatic performance, to shift the angle at which maximum reflectance reduction is obtained, or even to achieve chromatic performance which varies with angle of the transmitted light.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

What is claimed is:

1. A reduced reflectance polarized display for use with a light source, comprising:
   a display apparatus located a small distance in front of the light source;
   a cover glass, having a front side and a back side, located a small distance in front of the display apparatus with the back side facing the display apparatus;
   an auxiliary polarizer attached to the back side of the cover glass facing the display apparatus to reduce reflections; and
   a first quarter wave retarder attached to the auxiliary polarizer and a second quarter wave retarder attached to the display apparatus facing the auxiliary polarizer.

2. The display of claim 1 wherein the auxiliary polarizer is coated with an antireflection coating facing the display apparatus to further reduce reflections.

3. The display of claim 1 wherein the display apparatus has a front side and a back side, further comprising:
   a first substrate attached to the front side of the display apparatus and a second substrate attached to the back side of the display apparatus;
   a front polarizer, having an antireflection coating, attached to the first substrate facing the auxiliary polarizer; and
   a rear polarizer attached to the second substrate facing the light source.

4. The display of claim 3, further comprising a first quarter wave retarder attached to the auxiliary polarizer and a second quarter wave retarder attached to the front polarizer.

5. The display of claim 4 further comprising antireflection coatings on the first quarter wave retarder and the second quarter wave retarder.

6. The display of claim 4 wherein the first quarter wave retarder and the second quarter wave retarder have opposing birefringence.

7. The display of claim 4 wherein the first quarter wave retarder and the second quarter wave retarder are wideband quarter wave retarders.

8. The display of claim 3 wherein the auxiliary polarizer and the front polarizer are aligned in the same direction.

9. The display of claim 3 wherein the auxiliary polarizer and the front polarizer have parallel polarization axes.

10. A reduced reflectance polarized display for use with a backlight, comprising:
    a display layer placed between a front substrate and a rear substrate, both having a first and second surface wherein a rear polarizer is attached to the second surface of the rear substrate, located closer to the backlight, and a front polarizer is attached to the first surface of the front substrate wherein the front polarizer is coated with an antireflection coating;
    a cover glass having a first side and a second side with an antireflection coating coated on the first side;
    an auxiliary polarizer attached to the second side of the cover glass wherein the auxiliary polarizer, located a small distance from the front polarizer, is facing the front polarizer to reduce reflections in the display; and
    a first quarter wave retarder attached to the auxiliary polarizer and a second quarter wave retarder attached to the front polarizer.

11. The display of claim 10 wherein the auxiliary polarizer is coated with an antireflection coating facing the front polarizer to further reduce reflections in the display.

12. The display of claim 10 wherein the auxiliary polarizer and the front polarizer are aligned in the same direction.

13. The display of claim 10 wherein the auxiliary polarizer and the front polarizer have parallel polarization axes.

14. The display of claim 10 further comprising antireflection coatings on the first quarter wave retarder and the second quarter wave retarder.

15. The display of claim 10 wherein the first quarter wave retarder and the second quarter wave retarder have opposing birefringence.

16. The display of claim 10 wherein the first quarter wave retarder and the second quarter wave retarder are wideband quarter wave retarders.

* * * * *